3,509,071
SUPERCONDUCTING MOLECULAR SIEVES
Theodore P. Goldstein, Trenton, N.J., assignor to Mobil Oil Corporation, a corporation of New York
No Drawing. Continuation-in-part of application Ser. No. 623,233, Mar. 15, 1967. This application Apr. 13, 1967, Ser. No. 630,550
Int. Cl. H01b 1/02
U.S. Cl. 252—512  6 Claims

ABSTRACT OF THE DISCLOSURE

Superconductors are provided, and methods of making them, comprising crystalline aluminosilicates containing a metal. An exemplary composition is metallic lead in the pores of synthetic mordenite.

CROSS REFERENCE TO RELATED APPLICATIONS

This application is a continuation-in-part of U.S. application Ser. No. 623,233, filed Mar. 15, 1967, now abandoned.

BACKGROUND OF THE INVENTION (1) The field of the invention comprises superconducting materials.

(2) While the prior art discloses aluminosilicate molecular sieves containing a metal, it does not disclose sieves containing high concentrations of metal, nor does it disclose the use of the same as superconductors.

SUMMARY OF THE INVENTION

Crystalline aluminosilicates containing at least 20% by weight of metal dispersed in the interstitial channels thereof are shown to be superconductors.

DESCRIPTION OF THE SPECIFIC EMBODIMENTS

The invention relates to the conduction of current using superconductors comprising a mixture of a crystalline aluminosilicate zeolitic molecular sieve and a metal which, in bulk state, is superconducting. The mixture comprises at least 20% by weight of metal dispersed in the interstitial channels of the sieve, these channels having a diameter between 4 or 5 to 12 or 15 Angstroms and being arranged in each crystal of the sieve in a definite ordered array corresponding substantially to the fine structure of the crystal. Superconducting materials find use as current carriers, in superspeed switches, in high field magnets, etc.

Useful aluminosilicate zeolites are those defined by the formula:

$$M_{2/n}O:Al_2O_3:xSiO_2:yH_2O \tag{I}$$

where M is a cation such as alkali metal, alkaline earth metal, hydrogen, ammonium, etc.; $n$ is the valence of M, and $x$ and $y$ are numbers which, for a particular crystalline zeolite, fall in a definite range. Although these zeolites are well known, a brief description of them may be helpful. They consist basically of a rigid, three-dimensional framework of $SiO_4$ and $AlO_4$ tetrahedra. The tetrahedra are cross-linked by the sharing of oxygen atoms so that the atom ratio, $O/(Al+Si)$, is equal to 2. The electrovalence of each tetrahedron containing Al is balanced by the inclusion in the crystal of a cation, M in the above formula. One cation may be exchanged for another by ion exchange techniques. Spaces within the zeolite are occupied by water molecules prior to dehydration of the crystal, and it will be appreciated that these spaces are arranged in a definite ordered array. Removal of the water molecules produces a characteristic system of interstitial channels which, for a given zeolite, are of uniform size and, in some typical zeolites, are spaced about 3 or 4 Angstroms from one another. Access to the interstitial channels is by way of openings or pores in the surfaces of the zeolite, and, for a given zeolite, these pores are of uniform diameter. Thus, for "Zeolite 4A," the pores have a diameter of approximately 4 Angstroms; while, for "Zeolite 13X," the pores are of approximately 10 Angstroms diameter. The letter "X" is a means of distinguishing the interatomic structure of "X"-type zeolite from "A"-type zeolite. Zeolites are known in which the pore diameter may have a size in the range of about 3 to about 15 Angstroms.

Typical crystalline aluminosilicate zeolites include, among others, the synthetic zeolites described in the following references:

Type A—2,882,243
Type B—3,008,803
Type E—2,962,355
Type F—2,996,358
Type H—3,010,789
Type J—3,011,869
Type L—3,130,006
Type M—2,995,423
Type Q—2,991,151
Type T—2,950,952
Type U—3,248,170
Type W—3,012,853
Type X—2,882,244
Type Y—3,130,007
Type Z—2,972,516
Type ZK4—3,140,252
Type ZK5—3,247,195

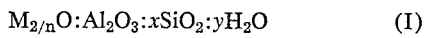

Also suitable for the invention, besides the foregoing, are modifications thereof; for example, type X, or any other type, exchanged by a rare earth metal, or by any other exchangeable metal. Natural zeolites are suitable, including levynite, dachiarite, erionite, faujasite, analcite, paulingite, noselite, phillipsite, brewsterite, flakite, datolite, chabazite, gmelinite, leucite, scapolite, mordenite etc.

The metal which is introduced into the interstitial voids of the zeolite is one selected from those known to be superconducting in bulk state and includes elements and alloys. Preferably it has a superconducting transition temperature as high as possible, say at least 3 or 4° K., and more preferably at least 0 or 10° K. It may include such elements as lead, tin, indium, mercury, niobium, technetium, lanthanum, tantalum, vanadium, etc., and such alloys as $GaNb_3$, $GaV_3$, $InLa_2$, MoRe, MoRu, $MoTc_3$, NbSn, $SiV_3$, etc. Alloys of Nb or Mo are particularly suitable. Other metals include cadmium, thallium, gallium, rhenium, thorium, zinc, zirconium, etc.

Although the selected metal is superconducting in bulk state, it was not known from this alone, prior to the tests hereinafter described, whether, in the filamentary state described herein, it would be superconducting. It may be of pertinence to note that a superconducting metal, as used herein, refers to the fact that the metal has zero resistance under the conditions of test.

The metal may be introduced to the zeolite in a number of ways, including melting or vaporizing the metal in the presence of the zeolite so that as water of hydration is removed, the fluid metal can flow into the channels so formed; or introducing a reducible organometallic compound, such as organotins, lead alkyls, mercury alkyls, and the like, into the channels, instead of fluid metal, and reducing such compound to elemental metal in situ; or base exchanging the metal into the zeolite, followed by reduction of the same to elemental metal. Also, a metal like mercury can be precipitated in nucleation sites, such as silver cations.

A preferred method is that first described, comprising melting the metal in the presence of the zeolite. According to that technique, a mixture is made by grinding the zeolite and metal together to provide an intimately mixed mass and thus favor subsequent entry of the metal into the interstitial voids of the zeolite. Conventional equipment is suitable for grinding. The ground mixture is then subjected to a sutiable vacuum, say 0.1 mm. or less, and at the same time is heated for a time sufficient to dehydrate the zeolite. The preferred metal for this method is one that melts during the heating, so that, as the water is driven out of the zeolite, the molten metal enters the interstitial channels so formed, i.e., is sorbed or occluded by them. Generally, heating may be continued for up to 10 or 20 hours, or more. Temperatures of up to about 350° C. are suitable, or up to 475° C., or even up to 650–700° C. The decomposition temperature of the zeolite, which is generally in the range of 700–800° C., should not, of course, be exceeded. Suitable metals useful in this method include indium, lead, mercury, tin, cadmium, bismuth and thallium, all of which melt below about 350° C. Useful higher melting metals include tellurium (M. 452° C.) and antimony (M. about 630° C.). Alloys of appropriate melting points are useful. The heating step may be discontinued when no more water is evolved as steam. Thereafter, the mixture may be allowed to cool. It generally contains at least 20%, preferably at least 25 or 30%, by weight of metal. By means of a trial run or two, and/or by calculating, one can initially take the correct amount of metal so that no excess is present at the end of the heating step. The cooled mixture comprises the superconducting material.

The material is in the form of finely divided particles of zeolite having the interstitial channels thereof filled with metal. These channels, as noted, have a uniform diameter in the range of 3 to 15 Angstroms, and they are arranged in the zeolite crystals in a definite ordered array. The channels are spaced apart from each other by a distance on the order, generally, of 3 to 5 Angstroms. The loaded channels thus resemble a cluster of ordered filaments of uniformly small diameter and spaced from each other by a uniformly small distance. According to this invention, it is desired to obtain this order of metal clusters or filaments; the order being determined by the framework of the crystalline aluminosilicate.

When a method is used in which the metal is vaporized in the presence of the zeolite, the step is carried out at reduced pressures, and the metal chosen should have as high a vapor pressure as possible. Mercury is an example of a suitable metal for this method.

The superconducting material may be used in various ways. For example, in order to use the material as a superconductor, it is dispersed in subdivided form in bulk metal, the latter being either the same as or different from that contained in the material; if different, it need not necessarily be super-conducting. Current may be introduced to the resulting mixture, and removed therefrom, by means of leads which can make contact with the bulk metal. Meanwhile, the subdivided material in the mixture is superconducting. It is considered that such material would also exhibit high feed field characteristics by virtue of the form of the metal contained therein.

The invention may be illustrated by the following examples:

EXAMPLE 1

A sample, in powdered form, of a synthetic mordenite known as Zeolon was employed. It corresponded to the formula $$Na_2O \cdot Al_2O_3 \cdot 10SiO_2(XH_2O)$$

and had an average port diameter of about 7 Angstroms. It was mixed with 30% by weight of highest purity powdered lead, and the mixture was ground in a mortar until the color was dark black. The mixture was pressed into pellets of ⅛" diameter by ⅛" thickness, and these were placed in a quartz tube and heated under vacuum (less than 0.1 mm. mercury) at 350° C. for 10 hours, during which time the color of the pellets changed to light gray. At 350° C., the lead, of course, was melted. Based on weight increase, the pellets contained about 30% by weight of lead. They were tested for superconductivity by examining a sample of the same by a mutual inductance test at liquid helium temperature. This test was carried out by placing the sample in the center of a small coil and observing the change in inductance of the coil as the temperature was varied between room temperature (293° K.) and the temperature of liquid helium (4.2° K.). An impedance bridge was used to measure the change in inductance. By this method, the sample was found to be superconducting at liquid helium temperature.

EXAMPLE 2

A zeolite-indium sample was prepared by ion exchanging Zeolon, as used in Example 1, with indium nitrate (99.99% purity) to produce an indium-exchanged Zeolon. The indium in the sample was then reduced to elemental indium by treatment overnight with gaseous hydrogen at about 300° C. The Zeolon thus contained elemental indium in an amount of about 30% by weight of the sample. During such heat treatment, the sample underwent a color change from pure white to gray. Pellets were formed of the sample. On testing, they were found to be superconducting at 3.4° K.

It will be understood that the invention is capable of obvious variations without departing from its scope.

In the light of the foregoing description, the following is claimed.

I claim:
1. In a method of transmitting current by means of a conductor, the improvement comprising using as conductor a material comprising a mixture of a crystalline aluminosilicate zeolitic molecular sieve and a metal which, in bulk state, is superconducting, said mixture containing at least 20% by weight of said metal dispersed in interstitial channels of the sieve, said channels having a diameter between 3 and 15 Angstroms, and said channels being arranged in each crystal of the sieve in a definite ordered array, whereby the superconducting metal is provided in an ordered array determined by the framework of the crystalline aluminosilicate.
2. Method of claim 1 in which the metal is one having a superconducting transition temperature of at least 3° K.
3. Method of claim 1 wherein said metal fills said channels.
4. A superconducting material comprising a crystalline aluminosilicate zeolitic molecular sieve containing a metal which, in bulk state, is superconducting, said metal being disposed in the interstitial channels of the sieve in an amount of at least 20% by weight of the material, said channels having a diameter of 3 to 15 Angstroms, and being arranged in each crystal of the sieve in a definite ordered array.
5. Material of claim 4 wherein said metal fills the channels.
6. Material of claim 4 wherein said metal has a superconducting transition temperature of at least 3° K.

References Cited

UNITED STATES PATENTS 3,013,984  12/1961  Breck _____ 252—455
3,305,656  2/1967  Devins _____ 252—455

DOUGLAS J. DRUMMOND, Primary Examiner

U.S. Cl. X.R.

252—455, 518, 521

PO-1050
(5/69)

UNITED STATES PATENT OFFICE
CERTIFICATE OF CORRECTION

Patent No. 3,509,071         Dated April 28, 1970

Inventor(s) Theodore P. Goldstein

It is certified that error appears in the above-identified patent and that said Letters Patent are hereby corrected as shown below:

Column 2, line 47, "0 or 10°K" should be --5 or 10°K--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents